Feb. 28, 1939. J. T. FIESE ET AL 2,148,547
VEGETATION MASCERATING UNIT
Filed Feb. 1, 1937 2 Sheets-Sheet 1

INVENTORS
J. T. Fiese
W. G. Firstenberger
BY
ATTORNEY

INVENTORS
J. T. Fiese
W. G. Firstenberger

Patented Feb. 28, 1939

2,148,547

UNITED STATES PATENT OFFICE 2,148,547

VEGETATION MASCERATING UNIT

Jesse T. Fiese and Welcome G. Firstenberger, Fresno, Calif.

Application February 1, 1937, Serial No. 123,388

6 Claims. (Cl. 130—27)

This invention relates to mascerating devices and particularly to the cylinder and concave units such as are used in threshers and various other machines.

The principal object of our invention is to so mount the teeth, both in the cylinder and concave, that they will be free from the loosening and breakage common with teeth as ordinarily mounted, and yet so that they will be capable of quick and easy replacement when necessary.

Another object is to construct a unit so that a positive cutting action will be obtained on slender "whippy" material (such as long tree prunings); and so that extremely heavy material passing between the cylinder and concave will tend to be fractured or weakened before reaching the concave teeth, and thus relieving the latter of the heavy strains which might break the same. These features are exceptionally of value when the unit is used for chopping up tree and vine cuttings left on the ground, which are liable to vary in size considerably, and for which, service our unit has been particularly developed.

A further object is to construct the cylinder and its supporting shaft so that they may be easily taken apart for replacement or repairs—a feature of considerable importance in the case of a cylinder of considerable length such as we use.

A still further object is to construct a one piece cylinder which irrespective of its length will be very strong without being excessively heavy.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
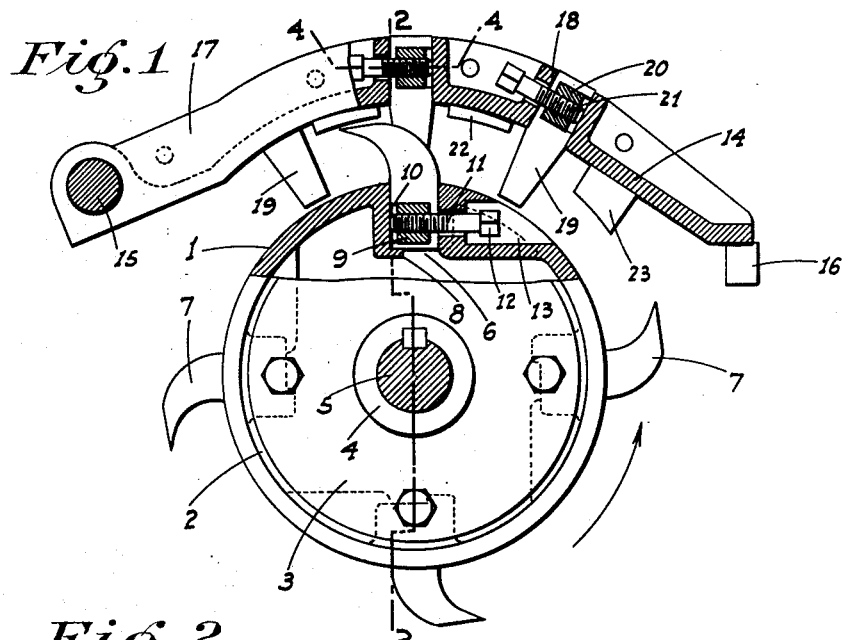
Figure 1 is an end view of the cylinder and concave unit partly in section.

Referring now more particularly to the characters of reference on the drawings, the cylinder 1 is a one piece cast member, having heads 2 adjacent its ends against which discs 3 are removably secured in centralized relation therewith. These discs are formed with axial bearing bosses 4 for the ends of stub shafts 5. In this manner the need of a continuous long shaft projecting through the cylinder is avoided and the shafts or cylinder may be easily removed for repairs or replacement with a minimum of trouble.

Formed in the cylinder are longitudinal extending rows of inwardly projecting relatively deep open radial pockets 6, of rectangular form. The different rows are spaced 90° apart and corresponding individual pockets are arranged in the same circular planes, so that bands of solid unbroken metal are provided on the cylinder between the adjacent circular rows of pockets. Also the inwardly projecting metal about the pockets forms continuous reinforcing ribs of end to end of the drum, strengthening the same against possible deflection. In this manner the drum may be made very strong without being excessively heavy and without relying on any shafting projecting through the drum to aid in supporting the same against such deflection.

Each pocket is arranged to receive the rectangular shanks of the teeth 7 of suitable shape, the shanks being of such thickness that when abutted against the ends of the pockets, they are spaced apart considerably. To limit the inward movement of the teeth flanges 8 project under the shanks from the inner ends of the pockets. A wedge clamping block 9 is disposed in each pocket between adjacent shanks, the adjacent faces of the latter being taper-recessed as at 10 for the depth of and with the same slope as the block. A set screw 11 is threaded through the block and its inner end abuts against the wall of the pocket at the wide end of the block. Beyond the opposite end of the block the screw projects freely through the adjacent wall of the pocket and is provided with a head 12 disposed inwardly of the periphery of the cylinder in an open recess 13 formed therein.

Figure 2:
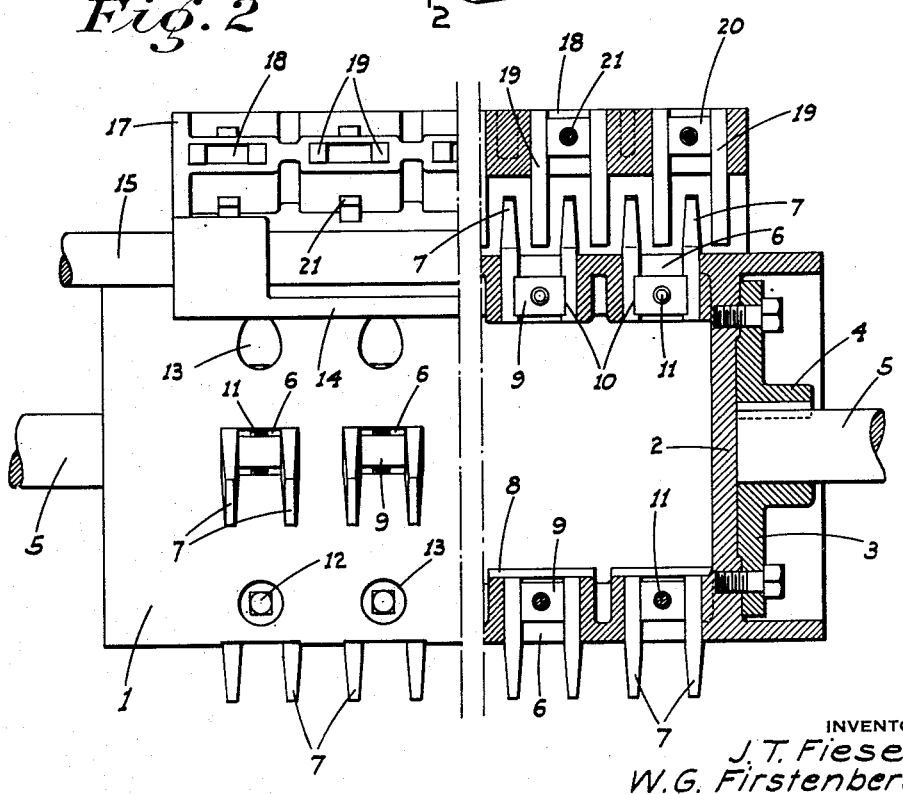
Figure 2 is a fragmentary longitudinal elevation of the unit, partly shown in section on the line 2—2 of Fig. 1.

By means of this construction advance of the screw will draw the block tightly across the shanks, forcing them apart and in firm and non-loosening engagement with the end walls of the pocket. At the same time the teeth may be easily and quickly removed by loosening the screw, so that the block will be drawn clear of the taper-recesses of the shanks. This construction enables us to use teeth having considerable thickness in the direction of shearing strains, so that the teeth are very strong and the likelihood of their being sheared off is reduced to a minimum. The spacing of the different pockets along the cylinder is such that all the teeth in a row are equally spaced apart as indicated in Fig. 2.

The concave, to cooperate with the cylinder, comprises a number of cast sections 14 supported at one end on a shaft 15 and at the opposite end resting on blocks 16. The sections at their ends have flanges 17 whereby adjacent sections may be bolted to each other.

Each section has a row of upwardly projecting open pockets 18 of the same size and end to end spacing as the cylinder pockets. Each pocket 18 receives the shanks of a pair of teeth 19, which are clamped in place by a wedge block 20 having a screw 21 projecting therethrough, in the same manner as the teeth 7. The pockets 18 are disposed in intermediate or staggered relation to the cylinder pockets, so that the teeth 19 will be disposed between the teeth 7 as shown in Fig. 2.

Figure 3:
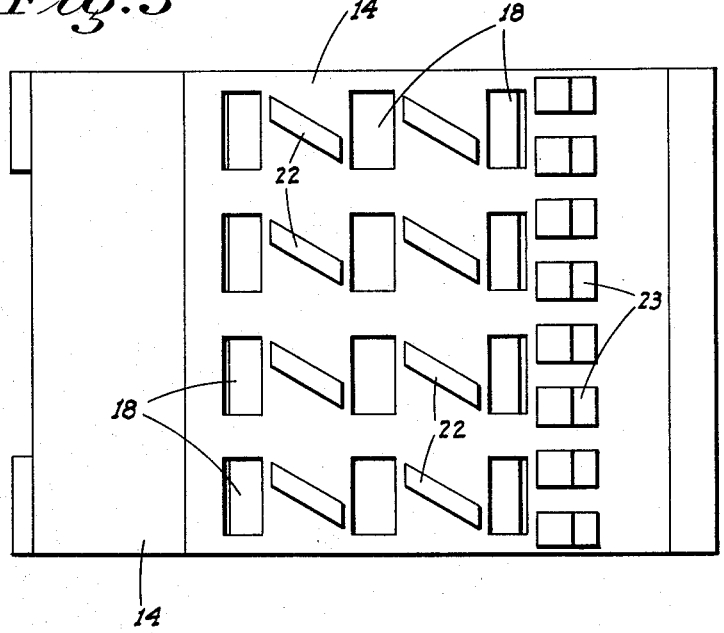
Figure 3 is an underside view of one of the concave sections with the teeth removed.
Figure 4:
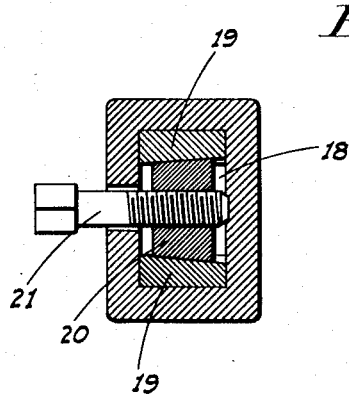
Figure 4 is a fragmentary enlarged section on the line 4—4 of Fig. 1 showing the clamping of a pair of teeth.

For use in a mascerating machine for chopping up tree and vine cuttings and the like and for which our unit is particularly designed, we provide certain additional features. One feature is a series of diagonally disposed shallow ribs 22 extending between the rows of pockets 18 on the underside of the concave as shown in Fig. 3, and clear of the path of the teeth 7 as shown in Fig. 1. These ribs act to deflect whippy twigs and the like transversely of the concave and into the path of the cooperating teeth and thus avoiding the possibility of such twigs passing straight through the unit without being acted on.

Another feature is a transverse row of heavy lugs 23 rigid with the concave and depending from the same ahead of the rows of pockets 18 and between the paths of the cylinder teeth. The depth of these lugs is sufficient to cause them to project inwardly of the path of the outer edges of the teeth 7 somewhat so as to cause any parts engaged by said lugs to be acted on by the teeth. The purpose of these lugs is to enable any extra heavy pieces, such as small rigid tree limbs, to be initially broken or weakened before coming in contact with the concave teeth, and eliminating the heavy strains which would otherwise be placed on said teeth.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In a mascerating unit, a tooth mounting member, means on said member to form pockets open to the exterior surface of said member, a pair of teeth for each pocket, said teeth having shanks projecting into said pocket, in spaced apart relation, a wedge block disposed between the shanks and having opposed sloping faces in contact with the shanks and disposed at right angles to the longitudinal plane of the teeth, the shanks having taper-recesses the depth of and conforming to the slope of said wedge-block faces, and means applied to the block to move the same in the direction of its narrow end.

2. A structure as in claim 1, in which said last named means comprises a screw threaded through the block lengthwise of said faces and adapted at its inner end to engage a wall of the pocket between the shanks and projecting through the opposite wall of the pocket to an exposed termination for manipulation, the cylinder having an open recess in the side in which said screw termination is disposed inwardly of the peripheral plane of the cylinder.

3. In a mascerating unit, a tooth mounting member, means on said member to form pockets open to the exterior surface of the member, a tooth for each pocket having a shank projecting into the pocket to bear on one side against one face of the pocket, a wedge block in the pocket engaging the opposite side of the shank and disposed at right angles to the longitudinal plane of the tooth, means acting on the wedge so that when the latter is moved lengthwise in one direction the shank will be clamped against said face of the pocket, and means to move the wedge in said direction.

4. In a mascerating unit, a tooth mounting member, means on said member to form pockets open to the exterior surface of the member, a tooth for each pocket having a shank projecting into the pocket to bear on one side against one face of the pocket, and means to releasably clamp said side of the shank against said face of the pocket and comprising a wedge block in the pocket disposed at right angles to the longitudinal plane of the tooth and movable lengthwise to effect the clamping action.

5. In a mascerating unit, a tooth mounting member, means on said member to form pockets open to the exterior surface of said member, a pair of teeth for each pocket, said teeth having shanks projecting into said pockets in spaced relation, a wedge block disposed between the shanks with its sloping faces engaging adjacent faces of the shanks, and means operatively engaged between the member and block to move the latter lengthwise of its faces.

6. In a mascerating unit, a tooth mounting member, means on said member to form pockets open to the exterior surface of said member, a pair of teeth for each pocket, said teeth having shanks projecting into said pockets in spaced relation, a wedge block disposed between the shanks with its sloping faces engaging adjacent faces of the shanks, and means applied to the block to move the same lengthwise of said sloping faces; said last named means comprising a screw threaded through the wedge block lengthwise of its sloping faces and adapted at its inner end to engage a wall of the pocket between the shanks, and projecting through the other wall of the pocket to an exposed termination for manipulation.

JESSE T. FIESE.
WELCOME G. FIRSTENBERGER.